(12) United States Patent
Page et al.

(10) Patent No.: US 7,090,768 B2
(45) Date of Patent: Aug. 15, 2006

(54) SURFACTANT FOR BITUMEN SEPARATION

(76) Inventors: Pat Page, P.O. Box 583, Medicine Hat, Alberta (CA) T1A 7G5; Jack Monkman, c/o P.O. Box 583, Medicine Hat, Alberta (CA) T1A 7G5

( * ) Notice: Subject to any disclaimer, the term of this patent is extended or adjusted under 35 U.S.C. 154(b) by 490 days.

(21) Appl. No.: 10/604,076

(22) Filed: Jun. 25, 2003

(65) Prior Publication Data

US 2004/0050755 A1   Mar. 18, 2004

Related U.S. Application Data

(60) Provisional application No. 60/319,347, filed on Jun. 25, 2002.

(51) Int. Cl.
  C10G 1/04   (2006.01)
  B08B 7/00   (2006.01)
(52) U.S. Cl. ................. 208/428; 208/390; 134/25.1; 134/40
(58) Field of Classification Search ............... 208/428, 208/390; 134/25.1, 40
  See application file for complete search history.

(56) References Cited

U.S. PATENT DOCUMENTS

| 3,644,194 A | 2/1972 | Keely et al. ................. 208/11 |
| 3,660,268 A | 5/1972 | Kelly et al. ................. 208/11 |
| 3,951,778 A | 4/1976 | Willard, Sr. ................. 208/11 |
| 4,229,281 A | 10/1980 | Alquist et al. ................. 208/11 |
| 4,462,892 A | 7/1984 | Schramm et al. ............. 208/11 |
| 4,704,200 A | 11/1987 | Keane ......................... 208/390 |
| 4,765,885 A | 8/1988 | Sadeghi et al. ............. 208/391 |
| 4,929,341 A | 5/1990 | Thirumalachar et al. .... 208/390 |
| 5,008,006 A | 4/1991 | Miller et al. ................. 209/166 |
| 5,120,428 A | 6/1992 | Ikura et al. ................. 208/188 |
| 6,193,766 B1 | 2/2001 | Jordan ......................... 44/308 |
| 6,251,290 B1 | 6/2001 | Conaway ..................... 210/759 |
| 2002/0003115 A1 | 1/2002 | Conaway et al. ........... 210/759 |

FOREIGN PATENT DOCUMENTS

| CA | 1094483 | 1/1981 |
| CA | 1100074 | 4/1981 |
| CA | 1108317 | 9/1981 |
| CA | 1236419 | 5/1988 |
| CA | 2009144 | 8/1991 |
| CA | 1293464 | 12/1991 |
| JP | 55031868 | 3/1980 |
| JP | 09020698 A * | 1/1997 |
| SU | 1068465 | 1/1984 |

* cited by examiner

Primary Examiner—Walter D. Griffin
(74) Attorney, Agent, or Firm—Bennett Jones LLP

(57) ABSTRACT

A surfactant for separating bitumen from sand includes an aqueous solution of hydrogen peroxide contacted with low rank coal. The low rank coal is preferably lignite. The surfactant may be used to clean bitumen, heavy oil and/or tar from sand, shale or clay at low concentrations and with mild agitation.

8 Claims, No Drawings

SURFACTANT FOR BITUMEN SEPARATION

CROSS REFERENCE TO RELATED APPLICATIONS

This application claims priority of U.S. Provisional Patent Application No. 60/319,347 filed on Jun. 25, 2002, the contents of which are incorporated herein in their entirety.

BACKGROUND OF INVENTION

The present invention relates to surfactants for separating hydrocarbons from solids. In particular, it relates to a surfactant derived from low-rank coal and hydrogen peroxide for separating bitumen from sand.

It is known to use hot water in order to separate particulate matter such as clay, sand or silt from oil and tar. However, a significant amount of oil and tar remains bound to the particulate matter after hot water treatment. Hydrogen peroxide is a known surfactant for removing oil and tar from sand, silt or clay. However, it may not be satisfactory in all cases and is often ineffective. Therefore there is a need in the art for a surfactant comprising hydrogen peroxide which may be more effective.

SUMMARY OF INVENTION

The present invention is directed to a surfactant for use in separating solids from hydrocarbons. In one aspect, the invention comprises hydrogen peroxide which has been contacted with a coal. Preferably, the coal comprises low-rank coal and more preferably comprises lignite. Preferably, the hydrogen peroxide comprises an aqueous solution of hydrogen peroxide which has a concentration of about 3% to about 6%.

In another aspect, the invention comprises a method of forming a liquid surfactant comprising the steps of mixing aqueous hydrogen peroxide with coal, allowing the mixture to stand and separating the liquid fraction from the solid fraction. The coal preferably comprises a low-rank coal.

In another aspect, the invention comprises a method of separating hydrocarbons from solids comprising the step of contacting the solids/hydrocarbon with a surfactant described herein or produced by a method described herein.

DETAILED DESCRIPTION

The present invention provides for a surfactant suitable for separating hydrocarbons from particulate solids. In particular, the surfactant may be used to separate sand, silt, and clay from oil, heavy oil, bitumen or tar. As used herein, the term "surfactant" shall mean a liquid which reduces the interfacial tension between a hydrocarbon and a solid material. The liquid may be a solution or emulsion of different substances.

In one embodiment, the surfactant is the result of contacting particulate low-rank coal, such as lignite, with a dilute solution of hydrogen peroxide. The hydrogen peroxide may be used in a concentration of about 3% to about 6%, although higher or lower concentrations may also be used. The coal is contacted with the hydrogen peroxide for a sufficient time, which may preferably be about 12 to about 24 hours. The length of contact time will depend on the concentration of hydrogen peroxide used and the contact temperature. The contact temperature may vary and it is not essential that it be controlled. For efficiency, the use of an ambient contact temperature is preferred. Higher concentrations and temperatures will reduce the contact time necessary to produce an efficacious product. For example, if the contact temperature is raised from 20° C. to 30° C., then the contact time may be reduced from 24 hours to about 16 hours. Also, raising the hydrogen peroxide concentration to 6% from 3% may reduce contact time to 12 hours from 24 hours at 20° C. Reasonable and minimal experimentation in this regard will easily provide one skilled in the art with effective parameters.

As used herein, the term "low rank" coal means coal having calorific values less than 14,000 BTU/lb on a moist, mineral-matter-free basis; and with a fixed carbon on a dry, mineral-matter-free basis of less than about 69%. The total oxygen content of low rank coals may vary in the range of about 5.0 wt. % (dry, mineral matter free basis) for bituminous coals to 35.0 wt. %, or more for lignite. Higher grades of coal may be used but are not preferred. Lignite has an average carbon content of 30%, volatile matter 27%, and heating value of 7,000 Btu per pound. The highest ranked coal, anthracite, has an average of 85% carbon, 5% volatile matter, and heating value of 12,750 Btu per pound. Sub-bituminous and bituminous coals are intermediate between these values. Without being restricted to a theory, it is believed that some portion of the volatile matter in the coal dissolves or is otherwise taken up in the aqueous solution and furthermore may be oxidized by the hydrogen peroxide solution. Therefore, it is believed that the higher proportion of volatile matter in the coal, the better results will be achieved.

Preferably, the low-rank coal is finely divided so that 100% of the material passes through a 30 mesh screen. However, one skilled in the art will recognize that finer or coarser particles may be used. If coarser particles are used, it may be necessary to increase the contact time with the hydrogen peroxide solution.

After contacting the hydrogen peroxide solution with the low-rank coal, the solid fraction is separated from the liquid fraction by any well known technique such as filtration or decanting. The liquid filtrate is the surfactant of the present invention.

The surfactant of the present invention may be used to clean hydrocarbon contaminated solids or particulate matter such as sand, silts or clay material. The contaminated material may be washed with the surfactant at an elevated temperature, preferably in the range of about 40° C. to about 80° C. Agitation is not required and only slight agitation is preferred. The simple action of transferring the solid/surfactant slurry mixture down a washing trough may provide sufficient agitation. As will be apparent to one skilled in the art, higher temperatures and longer dwell times may improve the effectiveness of the surfactant. Higher surfactant to solid ratios may also be utilized for heavily contaminated materials or materials where the hydrocarbons are tightly bound to the solid material.

The surfactant may be used at a concentration of less than 5% by volume of the solids/liquids slurry. In one embodiment, concentrations of less than about 2% and even less than 1% may be used. The inventors have found that concentrations as low as less than 0.005% may still be effective.

EXAMPLES

The examples below are carried out using standard techniques, which are well known and routine to those skilled in the art, except where otherwise described in detail. These examples are intended to be illustrative, but not limiting, of the invention.

Example 1

Preparation of Surfactant 3 volumes of 3% hydrogen peroxide was well mixed with 1 volume of lignite particles which were screened with a 30 mesh screen. The mixture was allowed to stand for 24 hours at 20° C. The liquid fraction was decanted and found to contain less than about 1% solids by weight. The liquid fraction was saved to be used as a surfactant.

Example 2

Cleaning of Sand

A slurry of sand (50 200 microns) contaminated with oil at 170,000 mg/kg was formed by mixing 10 kg of sand with 10 liters of fresh water. Surfactant from Example 1 was then added to the slurry to a final concentration of about 0.002% by volume and heated to 40° C. with mild agitation. After treatment, oil levels were measured at <50 mg/kg sand. Oil levels were measured using a standard Soxhlet extraction method well known in the art.

Example 3

Cleaning of Silt 10 kg of silt (2 50 microns) contaminated with oil at 170,000 mg/kg was mixed 10 liters of fresh water and surfactant from Example 1 was added to a final concentration of about 0.002%. The mixture was heated to about 40° C. with mild agitation. After treatment, oil levels were measured at <150 mg/kg sand.

Example 4

Cleaning of Clay 10 kg of clay (<2 microns) contaminated with oil at 170,000 mg/kg was mixed 10 liters of fresh water and surfactant from Example 1 was added to a final concentration of about 0.002%. The mixture was heated to about 40° C. with mild agitation. After treatment, oil levels were measured at <250 mg/kg sand.

Example 5

Prior Art Hot Water Treatment

As a comparison, the contaminated sand from Example 2 above was treated with hot water (80° C.) with vigorous agitation as is well known in the art. Oil levels could only be reduced to about 400 mg/kg.

The invention claimed is:

1. A method of separating hydrocarbons from solids comprising the step of contacting the solids/hydrocarbon with a surfactant; wherein said surfactant is prepared by mixing aqueous hydrogen peroxide with coal, allowing the mixture to stand and separating the liquid fraction from the solid fraction.

2. The method of claim 1 wherein the solids/hydrocarbon is contacted with the surfactant with no or mild agitation.

3. The method of claim 1 wherein the contacting step is performed at between about 40° C. and 80° C.

4. The method of claim 1 wherein the coal comprises low-rank coal.

5. The method of claim 4 wherein the mixture is allowed to stand for at least about 12 hours.

6. The method of claim 4 wherein the hydrogen peroxide has a concentration of about 3% to about 6%.

7. The method of claim 4 wherein the low-rank coal comprises lignite.

8. The method of claim 7 wherein the mixture comprises about 1 part lignite to about 3 parts aqueous hydrogen peroxide by volume.

* * * * *